United States Patent
Adams et al.

(10) Patent No.: US 11,467,059 B2
(45) Date of Patent: Oct. 11, 2022

(54) MULTI-WAVELENGTH PULSED OPTICAL TEST INSTRUMENT

(71) Applicant: VIAVI SOLUTIONS INC., San Jose, CA (US)

(72) Inventors: Robert Matthew Adams, Ottawa (CA); Joshua Philipson, Ottawa (CA); Chris Wagner, Kanata (CA); Grant Tessaro, Ottawa (CA)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 17/021,721

(22) Filed: Sep. 15, 2020

(65) Prior Publication Data

US 2021/0003472 A1    Jan. 7, 2021

Related U.S. Application Data

(63) Continuation of application No. 16/024,227, filed on Jun. 29, 2018, now Pat. No. 10,801,918.

(60) Provisional application No. 62/641,169, filed on Mar. 9, 2018.

(51) Int. Cl.
    *G01M 11/00*     (2006.01)

(52) U.S. Cl.
    CPC ...... *G01M 11/3127* (2013.01); *G01M 11/333* (2013.01)

(58) Field of Classification Search
    CPC ........... G01M 11/3127; G01M 11/333; G01M 11/30; G01M 11/335; H04J 14/0223
    See application file for complete search history.

(56) References Cited

U.S. PATENT DOCUMENTS

| | | |
|---|---|---|
| 3,825,683 A | 7/1974 | Pitroda |
| 3,839,599 A | 10/1974 | Pitroda |
| 4,302,835 A | 11/1981 | McMahon |
| 4,924,870 A | 5/1990 | Wlodarczyk |
| 5,408,091 A | 4/1995 | Perraud |
| 5,946,429 A | 8/1999 | Huang |
| 6,055,043 A | 4/2000 | Chambers |
| 6,388,782 B1 | 5/2002 | Stephens |
| 6,778,720 B1 | 5/2004 | Cekorich |
| 8,135,275 B2 | 3/2012 | Heismann |
| 8,402,834 B1 | 3/2013 | Moslehi |
| 8,757,870 B2 | 6/2014 | Hall |
| 9,448,162 B2 | 9/2016 | Zhai |

(Continued)

FOREIGN PATENT DOCUMENTS

| | | | |
|---|---|---|---|
| CA | 3031959 A1 * | 9/2019 | ............. G01K 11/32 |
| CN | 101079668 A * | 11/2007 | .......... H04J 14/0221 |

(Continued)

*Primary Examiner* — Mohamed K Amara
(74) *Attorney, Agent, or Firm* — Mannava & Kang, P.C (57) ABSTRACT

A test instrument tests an optical component of a fiber optic network. The test instrument determines signal parameters describing pulses to be emitted by lasers of the test instrument to test the optical component, and directly modulates the lasers to repeatedly emit the pulses at different wavelengths on a single fiber optic cable in a time division multiplexing manner. The test instrument triggers powering measurements to coincide with the emitted pulses, and determines performance parameters of the optical component based on the triggered power measurements.

20 Claims, 9 Drawing Sheets

(56) References Cited

U.S. PATENT DOCUMENTS

| | | | |
|---|---|---|---|
| 9,625,351 B2* | 4/2017 | Ataie | G01M 11/338 |
| 10,101,240 B1 | 10/2018 | Bonche | |
| 10,585,006 B2* | 3/2020 | Wilson | G01K 11/32 |
| 10,782,191 B2* | 9/2020 | Miller | G02B 6/43 |
| 2001/0053007 A1 | 12/2001 | Shikata | |
| 2001/0053225 A1 | 12/2001 | Ohira | |
| 2002/0028034 A1* | 3/2002 | Chen | G01M 11/3145 385/12 |
| 2003/0117612 A1 | 6/2003 | Wight | |
| 2003/0225334 A1 | 12/2003 | Hicks | |
| 2004/0028089 A1 | 2/2004 | Shake | |
| 2004/0208623 A1 | 10/2004 | Kumar | |
| 2006/0239687 A1 | 10/2006 | Gopinath | |
| 2007/0065156 A1 | 3/2007 | Lin | |
| 2007/0104417 A1 | 5/2007 | Tanaka | |
| 2008/0082085 A1 | 4/2008 | Krasutsky | |
| 2008/0292243 A1* | 11/2008 | Izumo | G08C 23/06 136/243 |
| 2009/0046295 A1 | 2/2009 | Kemp | |
| 2009/0244691 A1 | 10/2009 | Mueller | |
| 2011/0097090 A1 | 4/2011 | Cao | |
| 2011/0158653 A1 | 6/2011 | Mazed | |
| 2011/0182587 A1* | 7/2011 | Jackel | H04B 10/508 398/93 |
| 2012/0281982 A1* | 11/2012 | Frisken | G02B 6/29313 398/34 |
| 2012/0293806 A1 | 11/2012 | Cranch | |
| 2014/0112361 A1 | 4/2014 | Njegovec | |
| 2015/0253217 A1 | 9/2015 | Gurusami | |
| 2016/0041065 A1* | 2/2016 | L'Heureux | G01M 11/3154 356/73.1 |
| 2016/0134392 A1 | 5/2016 | Effenberger | |
| 2016/0209295 A1* | 7/2016 | Taverner | G01D 5/35303 |
| 2017/0019168 A1* | 1/2017 | Menard | H04Q 11/0005 |
| 2017/0334574 A1* | 11/2017 | Wilson | G08C 23/04 |
| 2017/0336269 A1* | 11/2017 | Wilson | G01K 11/3206 |
| 2018/0017464 A1 | 1/2018 | Na | |
| 2018/0259422 A1 | 9/2018 | Castro | |
| 2019/0277709 A1 | 9/2019 | Miller | |
| 2021/0356357 A1* | 11/2021 | Okamoto | H04B 10/2916 |

FOREIGN PATENT DOCUMENTS

| | | | | |
|---|---|---|---|---|
| CN | 106687793 A | * | 5/2017 | G01J 1/0271 |
| KR | 20120118094 A | * | 10/2012 | H04B 10/13 |

* cited by examiner

MULTI-WAVELENGTH PULSED OPTICAL TEST INSTRUMENT

PRIORITY

The present application is a Continuation of commonly assigned and co-pending U.S. patent application Ser. No. 16/024,227, filed Jun. 29, 2018, which claims priority to U.S. provisional patent application Ser. No. 62/641,169, filed Mar. 9, 2018, which is incorporated by reference in its entirety.

BACKGROUND

When it comes to fiber-to-the home (FTTH) or the other fiber network architectures (FTTx), optical test and quality engineers are on the front line of the battle between cost and reliability. On one hand, there are expectations to select the lowest cost optical components (splitters, cables, connectors, and enclosures or frames that hold connection points), but there are also expectations that the components will last for 25 years or more. Accordingly, audit programs are often employed to continually require environmental stress testing of optical components. Insertion Loss (IL), Polarization Dependent Loss (PDL), and Return Loss (RL) are critical performance parameters for many optical components. Accelerated aging and real-time test monitoring has become the standard approach to demonstrating equipment lifespan.

Measuring and testing of the optical components for critical performance parameters, including IL, RL, Polarization Dependent Loss (PDL), etc., may be performed by connecting a device under test (DUT), such as an optical component of a fiber optic transmission system, to an optical input source, such as a laser, to measure the performance parameters. To measure the performance parameters of the DUT, typically the measurements are performed in a continuous wave fashion, one wavelength at a time. For example, one would change the source wavelength, and then remeasure. However, it is difficult to get multi-wavelength measurements out of a continuous wave measurement process at high speed in a cost-effective and continuous way.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, and the term "including" means including but not limited to. The term "based on" means based at least in part on.

According to an embodiment, time-division multiplexed measurements are taken to determine performance parameters, such as IL, RL, PDL, etc., of a device under test (DUT). For example, a test instrument to test the DUT includes multiple optical sources, e.g., lasers, that are each configured to transmit optical signals at different wavelengths ($\lambda$s) on a single optical fiber in a time division multiplexing fashion. The lasers are pulsed in a serial time-interleaved fashion and power measurements are triggered to coincide with the various $\lambda$ sources. For example, the test instrument modulates each laser in a controlled way (e.g., the timing is controlled) to transmit $4\lambda$'s on a single fiber in sequence. For measuring the performance parameters, the test instrument generates an electrical trigger signal to indicate the correct moment to sample the $\lambda$'s for each signal, in turn, so as to rapidly build up tables of IL, RL, and PDL measurements. Some technical advantages of the continuous-wave (CW), multi-wavelength measurement process may include the ability to obtain broadband information about IL, RL and PDL performed in a pseudo-CW manner. Also, the measurement setup is relatively simple and cheap, and testing speed is improved and provides the ability to obtain high frequency updates.

Figure 1:
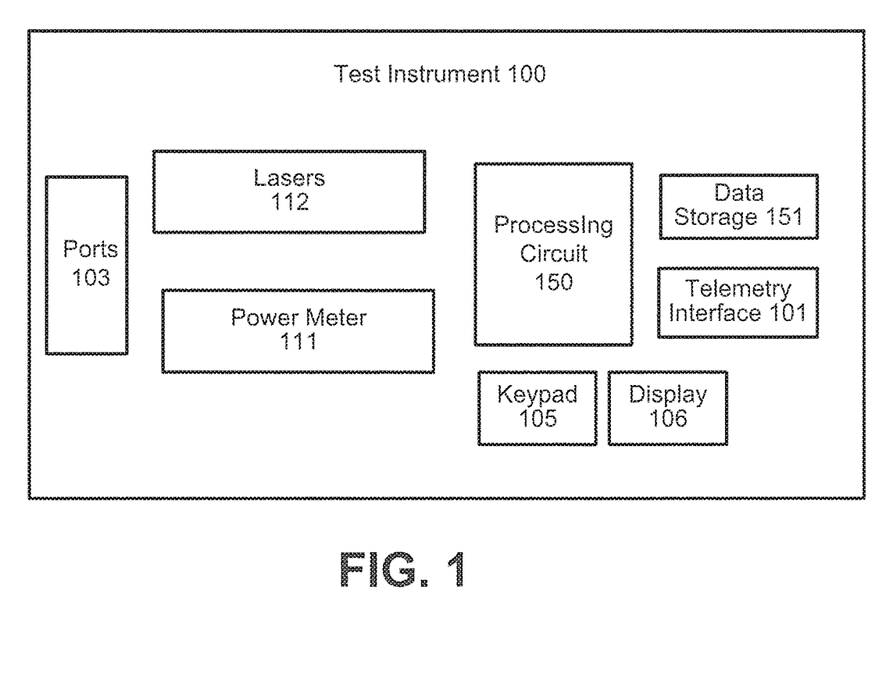
FIG. 1 shows a high-level block diagram of a test instrument, according to an example of the present disclosure.

FIG. 1 shows a high-level block diagram of test instrument 100, according to an example of the present disclosure. The test instrument 100 may include components other than shown. The test instrument 100 may include one or more ports 103 for connecting the test instrument 100 to a device under test (DUT) via fiber optic cable(s). The ports 103 may include connectors for connecting to optical cables. The test instrument 100 may include a telemetry interface 101 for connecting to a telemetry channel, such as a WiFi interface, Bluetooth interface, cellular interface or another network interface. The test instrument 100 may connect to a remote device via the telemetry interface 101, such as to send measurements or to receive instructions for programming the lasers 112.

The test instrument 100 may include a user interface which may include a keypad 105 and/or a display 106. The display 106 may include a touch screen display. A user may interact with the test instrument 100, such as to enter information, select operations, view measurements, view interference profiles, etc., via the user interface.

A data storage 151 may store any information used by the test instrument 100 and may include memory or another type of known data storage device, including volatile and nonvolatile data storage. The data storage 151 may store power level measurements and/or any other measurements or data or parameters determined by or used by the test instrument 100. The data storage 151 may include a non-transitory computer readable medium storing machine-readable instructions executable by processing circuit 150 to perform operations of the test instrument 100.

The test instrument 100 includes multiple lasers 112, or other types of optical sources, that can generate optical signals for testing a DUT connected to the test instrument 100. Any type of suitable optical source, other than a laser, may be used in the test instrument 100. The lasers 112 may include semiconductor lasers. The lasers 112 may be directly modulated lasers (or they may be externally modulated. Directly modulated is cheaper, and desirable if possible). In examples described below, electrical signals may be generated by processing circuit 150 to directly module the lasers 112 to produce pulsed optical signals at different λ's in a serial time-interleaved manner. The pulses are time division multiplexed on a fiber optic cable for transmission to a DUT. Examples are described below whereby 4λ's are transmitted on a fiber optic cable to test a DUT. However, any number of λ's may be used to test a DUT. Also, in the examples described below 4 lasers may be used to transmit 4λ's on the fiber optic cable, however, the lasers may be independently controlled so one or more of the lasers may not transmit a signal on the fiber optic cable.

A power meter 111 is an optical power meter that can measure the power in an optical signal. The power meter 111 measures the optical power of the sampled λ's to calculate performance parameters of the DUT, such as IL, RL, and PDL measurements. For example, a DUT may be connected to the fiber optic cable to measure performance parameters of the DUT by the test instrument 100. The processing circuit 150 modulates each laser in a controlled manner, and to measure the performance parameters, the processing circuit 150 may generate signals to trigger the power meter 111 to sample the optical pulses at the different λ's at the proper times. In this manner, a table of power measurements and IL, RL, and PDL measurements may be automatically and rapidly generated for all the λ's.

The processing circuit 150 may include any suitable hardware to perform the operations described herein. The operations include measuring and testing operations, including power referencing and determining performance parameters (e.g., IL, RL, PDL, etc.) of the DUT based on the sampled λ's. The hardware of the test instrument 100, including the processing circuit 150, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 100 described herein may be performed by the processing circuit 150 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. In an example, the processing circuit 150 comprises an FPGA with registers. The registers may be programmed with various values to control the period and delay of the signals emitted by the lasers 112 as is further discussed below. For example, bits may be stored in the registers to indicate delay, period, system period, laser enabling, pulse mode enabling, etc.

As indicated above, the processing circuit 150 may calculate performance parameters, such as IL, RL and PDL, for a DUT based on optical power measurements which may be measured by the power meter 111. Examples of calculating the performance parameters for a DUT connected to the test instrument 100 are described below. For example, IL may be calculated as follows: IL=$P_{TX}$-$P_{RX}$. $P_{TX}$ is the optical power output by the laser, such as one of the lasers 112, and $P_{RX}$ is the received optical power.

RL indicates the loss a signal experiences after being back-reflected from a DUT. RL may be calculated as follows: RL=$P_{TX}$-$P_{BR}$. $P_{BR}$ is the corresponding amount of optical power back-reflected, attributable solely to the DUT. In an example, RL may be measured by first measuring $P_{BR\ TOT}$, which is the summed total backreflected light from the DUT in addition to the system backreflected power, and then subtracting the system backreflection from $P_{BR\ TOT}$ to find the power backreflected solely due from the DUT. This is represented by the following equation: $P_{BR}$=$P_{BR\ TOT}$-$P_{BR0}$, where $P_{BR0}$ is the measured system backreflection. Then, RL may be calculated as indicated above.

Referencing is a general set of processes and algorithms by which the system samples and monitors the stability of potential sources of drift during a measurement cycle. Referencing may be performed, prior to measuring performance parameters of the DUT, to calibrate $P_{TX}$ or other values to account for drift of the input optical power, and/or loss caused by the test instrument or a patch cord connecting the DUT.

There are several different ways to measure polarization dependent loss (PDL) of a device. In an example, the conventional Mueller-Stokes method may be used to calculate PDL. For example, four well-known polarization states are applied by the test instrument 100. The optical power transmission is measured with an optical power meter at these four states over a predefined wavelength range and the PDL is calculated from those results using the Mueller-Stokes method.

Figure 2:
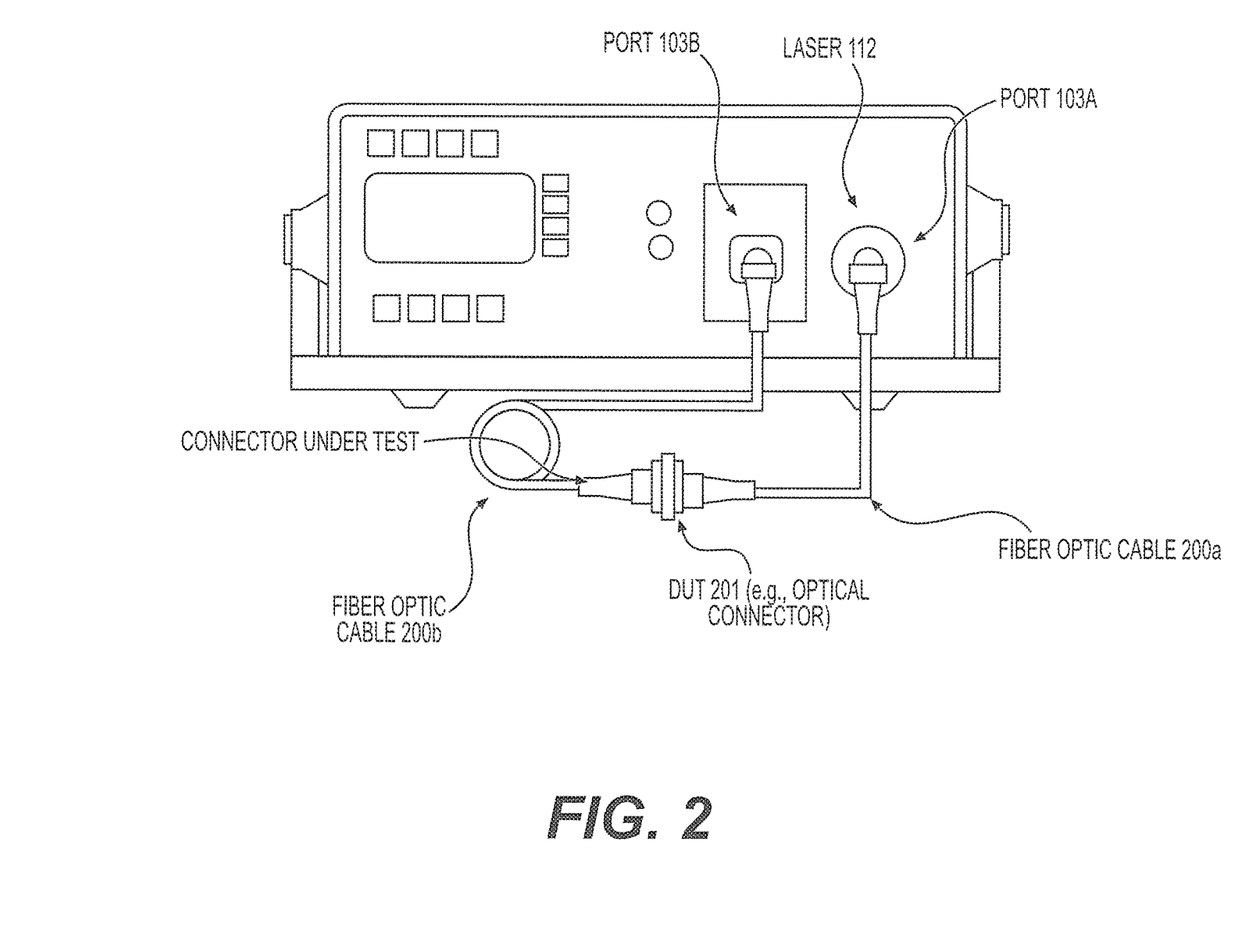
FIG. 2 shows an example of a setup of the test instrument to test a DUT.

FIG. 2 shows an example of a setup for the test instrument 100 to test a DUT 201. The DUT 201 may be an optical component of a fiber optic network. In an example, the DUT 201 may be a passive optical component, such as a splitter, a cable, a connector, and an enclosure or frame that hold connection points, etc. The DUT 201 is connected to the test instrument 100 via optical cables. As shown, the DUT 201 is an optical connector. In FIG. 2, fiber optic cables 200*a-b* connect the DUT 201 to the test instrument 100. For example, fiber optic cable 200*a* is connected between port 103A and a first side of the DUT 201. The lasers 112 emit the optical pulses into the fiber optic cable 200*a* via the port 103A. Also, a fiber optic cable 200*b* is connected between the connector and a port 103B of the test instrument 100. The power meter 111 may be connected to the port 103B to measure power of received optical signals. The power meter 111 may also measure the power of the signals emitted onto the fiber optic cable 200*a* before the signals are received at the DUT 201. In an example, the lasers 112 emit optical signals at different λ's into the fiber optic cable 200*a* in a time division multiplexed manner, and the optical signals pass through the DUT 201 and are transmitted to the test instrument 100 via the fiber optic cable 200*b*. The power meter 111 in the test instrument 100 can measure various power measurements of the received signals that passed through the DUT 201 so the processing circuit 150 can measure performance parameters of the DUT 201, such as IL, RL and PDL. DUTs other than an optical connector may similarly be connected to the test instrument 100 to determine performance parameters of the DUTs.

Figure 3:
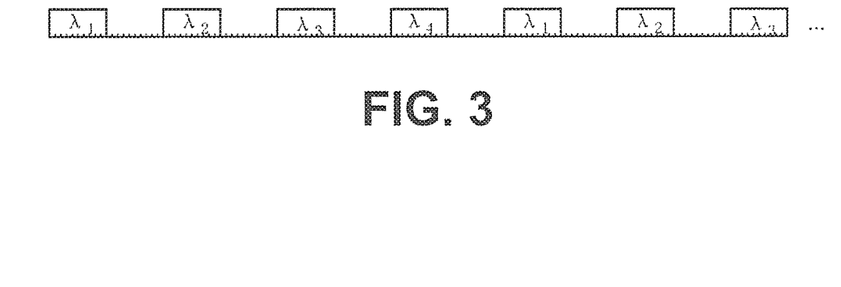
FIG. 3 shows an example of a series of pulses that may be emitted by the test instrument to test the DUT.
Figure 4:
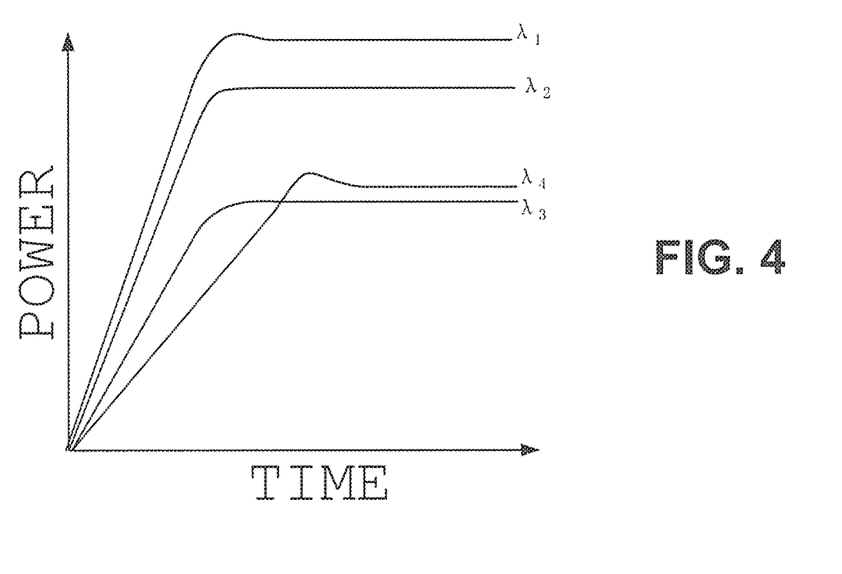
FIG. 4 shows turn on laser characteristics.

As is generally discussed above, the lasers 112 can insert multiple optical pulses at multiple wavelengths into a connected fiber optic cable by modulating each laser in a controlled manner, and the received power is measured by sampling at correct moments. The test instrument 100 can perform rapid IL, RL and PDL measurements by dynamically synchronizing measurements on a pulse train of wavelengths. The pulse train is emitted by the lasers 112 being turned on-and-off, at some clock cycle. The pulse train may be considered a Direct-Modulation Time-Interleaved (DMTI) series of pulses that are emitted by fiber-coupled, fixed-wavelength emitters, such as lasers 112. FIG. 3 shows that a DMTI series of pulses at different wavelengths, e.g., $\lambda_1$-$\lambda_4$, may be emitted by the lasers 112. The series of pulses is also referred to as a pulse train. A period of each pulse and the spacing and overlapping of the pulses and a period of a group of pulses may be programmatically defined and changed if needed as is further described below. In an example, the lasers 112 are turned on and off via Standard Commands for Programmable Instruments (SCPI) commands, with the known limitation of a non-deterministic clock, and a precision on the order of 10's to 20's of milliseconds. SCPI defines commands and a syntax for controlling and programming test equipment. There may be a delay for each pulse to reach a predetermined power level, and FIG. 4 shows a turn on laser characteristics testable illustrating the delay.

Figure 5:
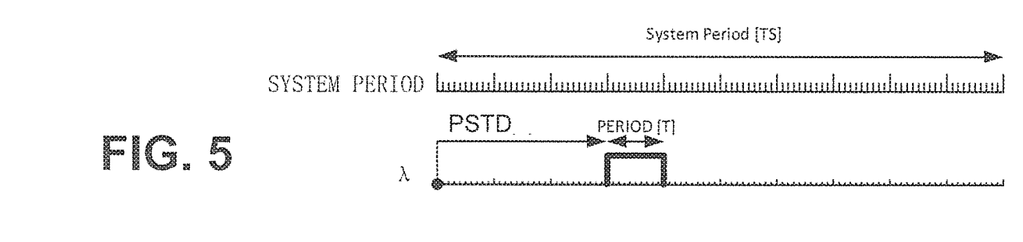
FIG. 5 shows a period of a pulse train.
Figure 6:
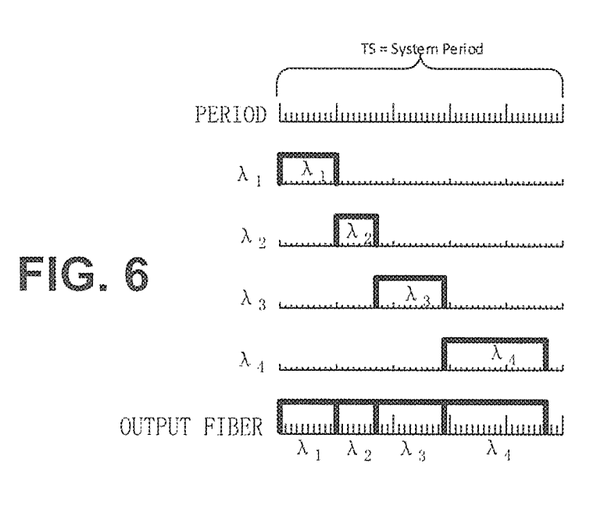
FIG. 6 shows that a delay of each wavelength, $\lambda$ and duration can be set independently within any one system period.
Figure 7:
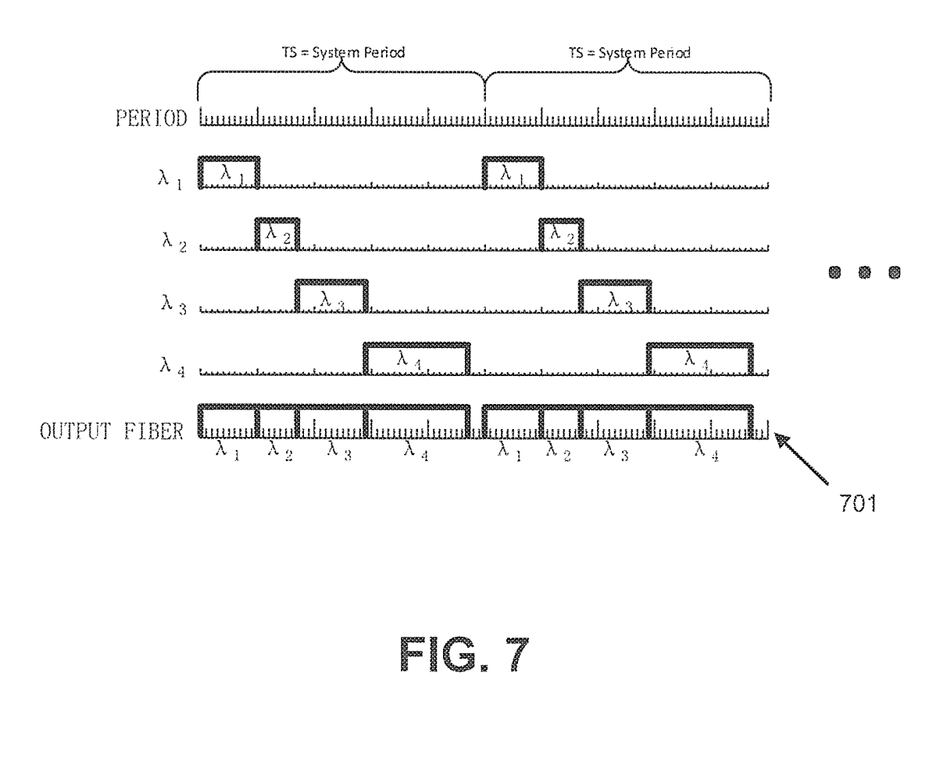
FIG. 7 shows a repeating pulse pattern.

Various signal parameters may be specified to control the pulse train emitted by the lasers 112 to test the DUT 201 with different wavelength pulses. Examples of the signal parameters are shown in FIGS. 5-7, and the signal parameters define and control the pulse train emitted by the lasers 112. The signal parameters may include a system period, referred to as TS. The pulse train is repeated each TS. FIGS. 5-6 show an example of a TS and a pulse train of $\lambda_1$-$\lambda_4$ in a TS. FIG. 7 shows that the pulse train is repeated in consecutive TSs. Also, the signal parameters define characteristics for each pulse in a pulse train. Each pulse has a wavelength. The wavelength may be fixed. For example, the lasers 112 may include a laser for each of $\lambda_1$-$\lambda_4$. Also, each pulse has a pulse start time delay, PSTD, and a period, T. The PSTD and T are defined relative to the start of the TS, i.e., a frame boundary. For example, FIG. 5 shows that the PSTD for a pulse is defined from the start of the TS to the rising edge of the pulse. The T is the duration of the pulse. The PSTD and T of each pulse can be set independently, and may be repeated for each consecutive TS. The pulses may be configured as a contiguous block, but the pulses may be overlapped and the sequencing of the pulses in a TS may be changed. The PSTD of the pulses in a TS may be used to specify when a laser is turned on, which in turn, controls the sequencing of the pulses.

The signal parameters for the pulse train may be repeated for each TS, such as shown in FIG. 7. FIG. 7 explicitly illustrates two TS periods but the TS is repeated. This pulse train may be repeated until the pulse generation is disabled. Each pulse may be defined by individual PSTD and T values. For example, for 4$\lambda$'s, the pulses are characterized by 8 parameters: four independent periods (e.g. [T1, T2, T3, T4]) occurring after four independent delays relative to the start of the system period (e.g. [PSTD1, PSTD 2, PSTD 3, PSTD 4]). The timing of when the pulses are emitted may be determined by bits set in a register. For example, if a bit corresponding to the n-th wavelength (e.g. n=[1-4]) is "1", then that laser is pulsed according to preceding definitions, which may be programmed. If the bit is "0", then that laser is not to be pulsed. In this way, the lasers 112 can be controlled. At 701, FIG. 7 shows an example of the pulse train that may emitted by the lasers 112 on the fiber optic cable 200a. The pulse train is described by way of example as having 4$\lambda$s but a different number of $\lambda$s may be provided in the pulse train.

Figure 8:
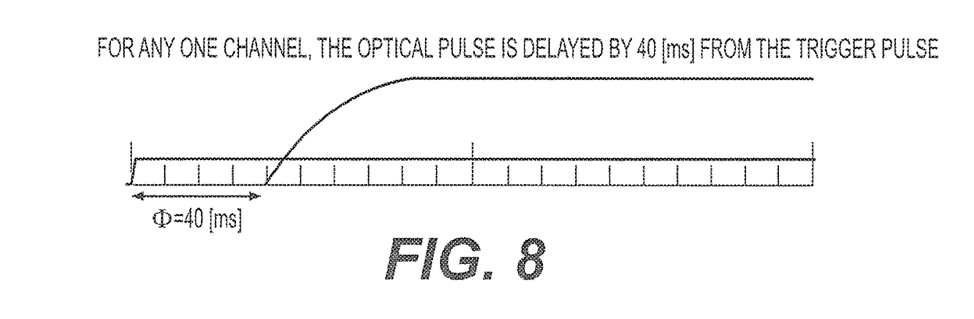
FIG. 8 shows an example of latency.
Figure 9:
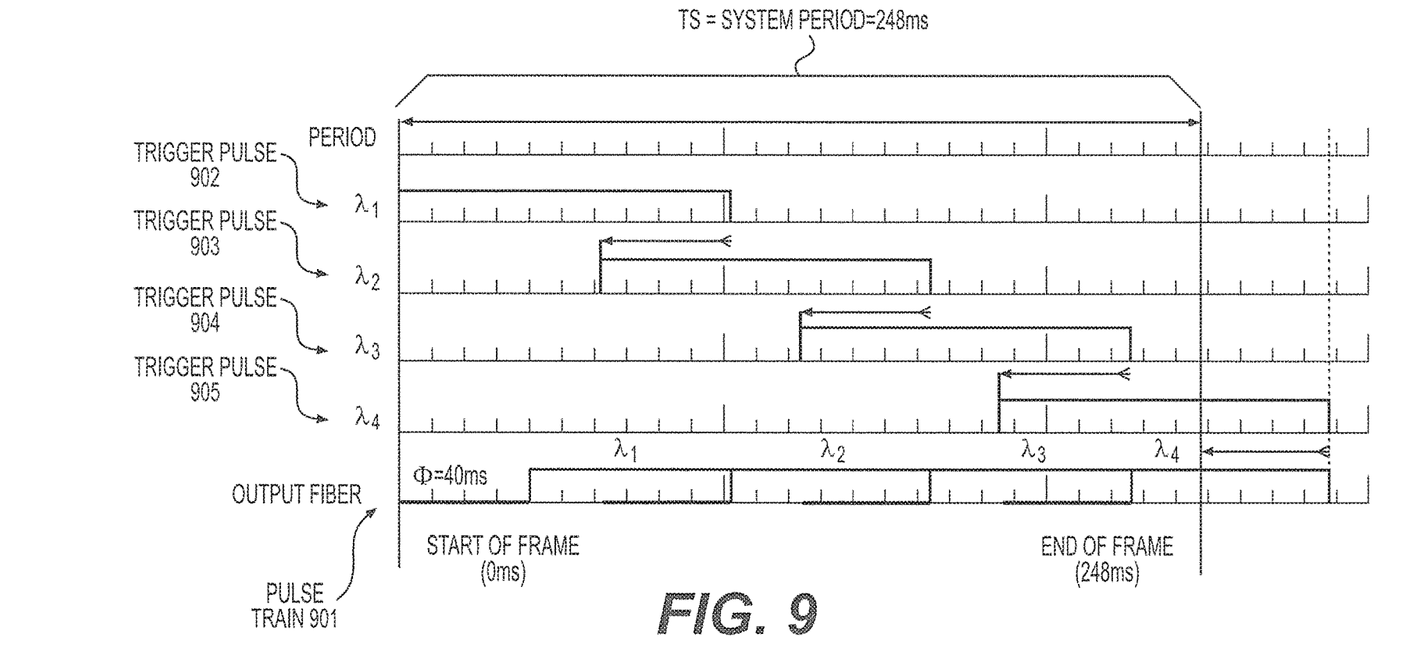
FIG. 9 shows an example of a pulse train generated in response to trigger pulses.

Various hardware implementations of the test instrument 100 may result in a latency from a time when a command to trigger a laser to emit an optical signal, referred to as a trigger pulse, is generated and a time when the laser emits the optical signal on the fiber optic cable. An example of the latency is shown in FIG. 8 and the latency is represented as $\phi$. In an example, $\phi$ is approximately 40 milliseconds (ms) but $\phi$ may vary dependent on the hardware implementation. The processing circuit 150 considers $\phi$ when calculating the delay, D, for each of the pulses in a pulse train 901, and this delay, D, is used to determine when to sample the pulse train to measure power for each $\lambda$ output by the lasers 112. For example, the delay for each of the pulses i in a system period TS is calculated according to equation 1: $D_i=(i-1)(W-\phi)$. In equation 1, i is an integer greater than or equal to 1 and represents the pulses in the TS, where i=1 represents the pulse closest to a start of the TS. For example, FIG. 9 shows the pulse train 901 emitted by 4 lasers on the fiber optic cable 200a for each of $\lambda_{1-4}$. Trigger pulses for $\lambda_{1-4}$ are also shown at 902-905, respectively. The trigger pulses 902-905, for example, are electrical signals, also referred to as electrical modulating signals or command pulses, that may be generated by the processing circuit 150 to directly modulate the lasers 112 to emit the pulses in the pulse train 901. The delay, D, for the first pulse of the pulse train 901 that is closest to the start of the TS, which is the pulse for $\lambda_1$, is $D_1$, where i=1. The next closest pulse in the pulse train 901 (e.g., for $\lambda_2$) has a delay $D_2$, where i=2, and so on. In equation 1, $W=T+\phi$, where T is the period of the pulse, also referred to as dOn. In an example for calculating $D_i$, assume the following: $\phi=40$; and T for each of the pulses in the TS is the same whereby T=62. Then, $W=T+\phi=102$. Therefore, calculating $D_i$ according to equation 1 for each of the pulses yields the following values for $D_i$: D1=0; D2=W–$\phi$=62; D3=2W–2$\phi$=124; and D4=3W–3 $\phi$=186. The delays $D_1$-$D_4$ generally indicate when the optical signals should be sampled by the power meter 111 for taking power measurements, such as for determining performance of the DUT 201 (e.g., IL and RL). The sampling may include sampling the optical signals, e.g., pulse train 901, emitted on the fiber optic cable 200a shown in FIG. 2, and sampling the optical signal received at the port 103A via fiber optic cable 200b shown in FIG. 2. The pulses for each of $\lambda_{1-4}$ are sampled for measurements. The sampling may be performed a few hundred microseconds after the delay, D, for each $\lambda$ to ensure that the pulse is being sampled while it is enabled. From the sampled signals, IL and RL and other performance parameters of the DUT may be determined, such as described above with respect to the equations for IL and RL. Also note that in this example shown in FIG. 9, TS=4×T=248 because each of the periods T in the TS are the same. However, the length of each period T may be independently set and can vary for each A.

Figure 10:
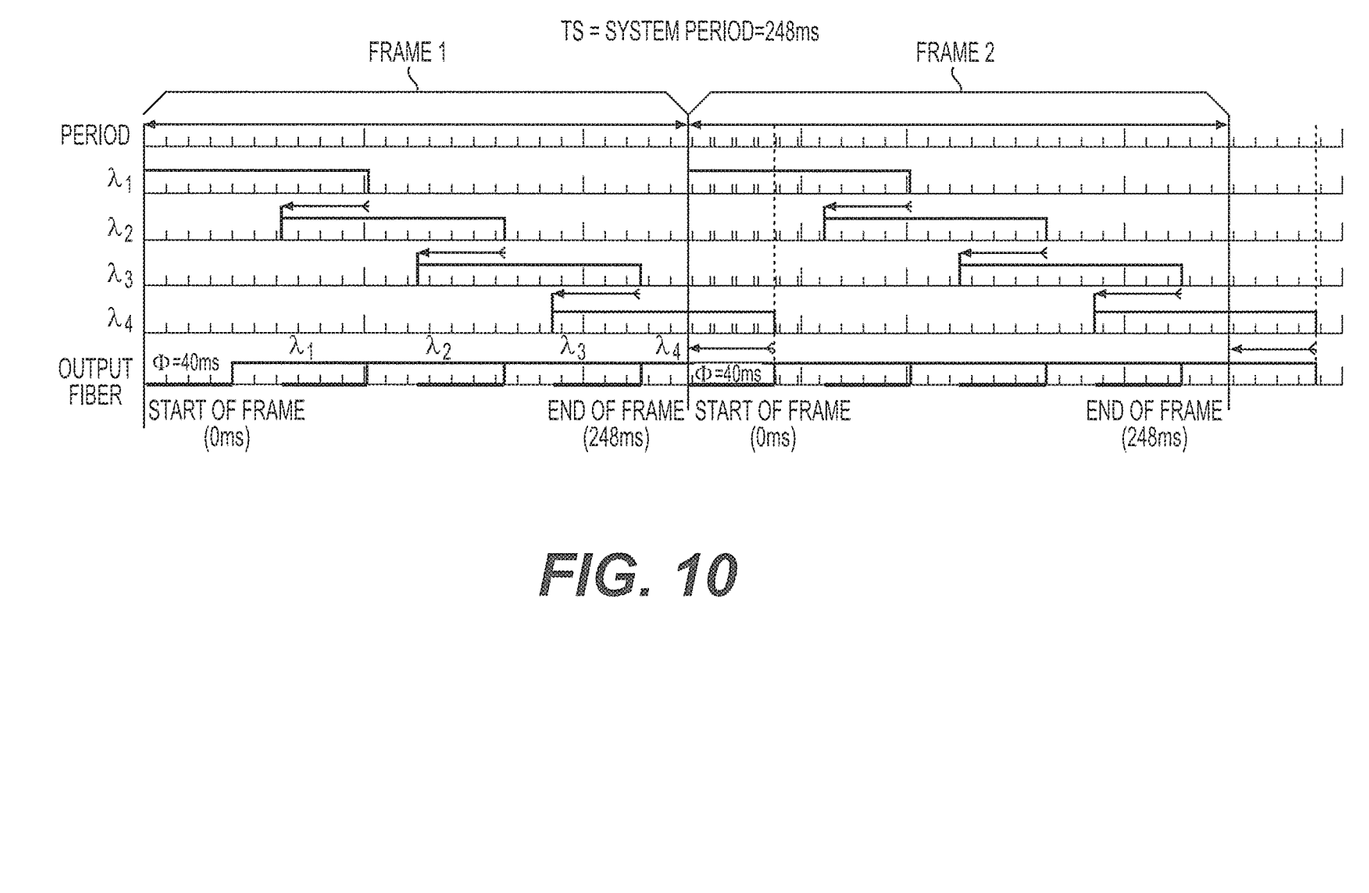
FIG. 10 shows an example of frame packing.

FIG. 10 shows an example of frame packing. A frame refers to the pulses transmitted in a system period, TS. The frames are continuously repeated until the DMTI testing is ended. The frames can be tightly packed together with no gap therebetween to maximize the number of measurements over time. For example, the frames are packed together with no gap by making each frame smaller than the "ON" time for the last pulse. The only requirement is that the first laser cannot come back on until it went off, which is not relevant in the example shown in FIG. 10 because the laser sequencing in this example is such that the last pulse in a frame is for $\lambda_4$ and the first pulse for the next frame is for $\lambda_1$.

Figure 11:
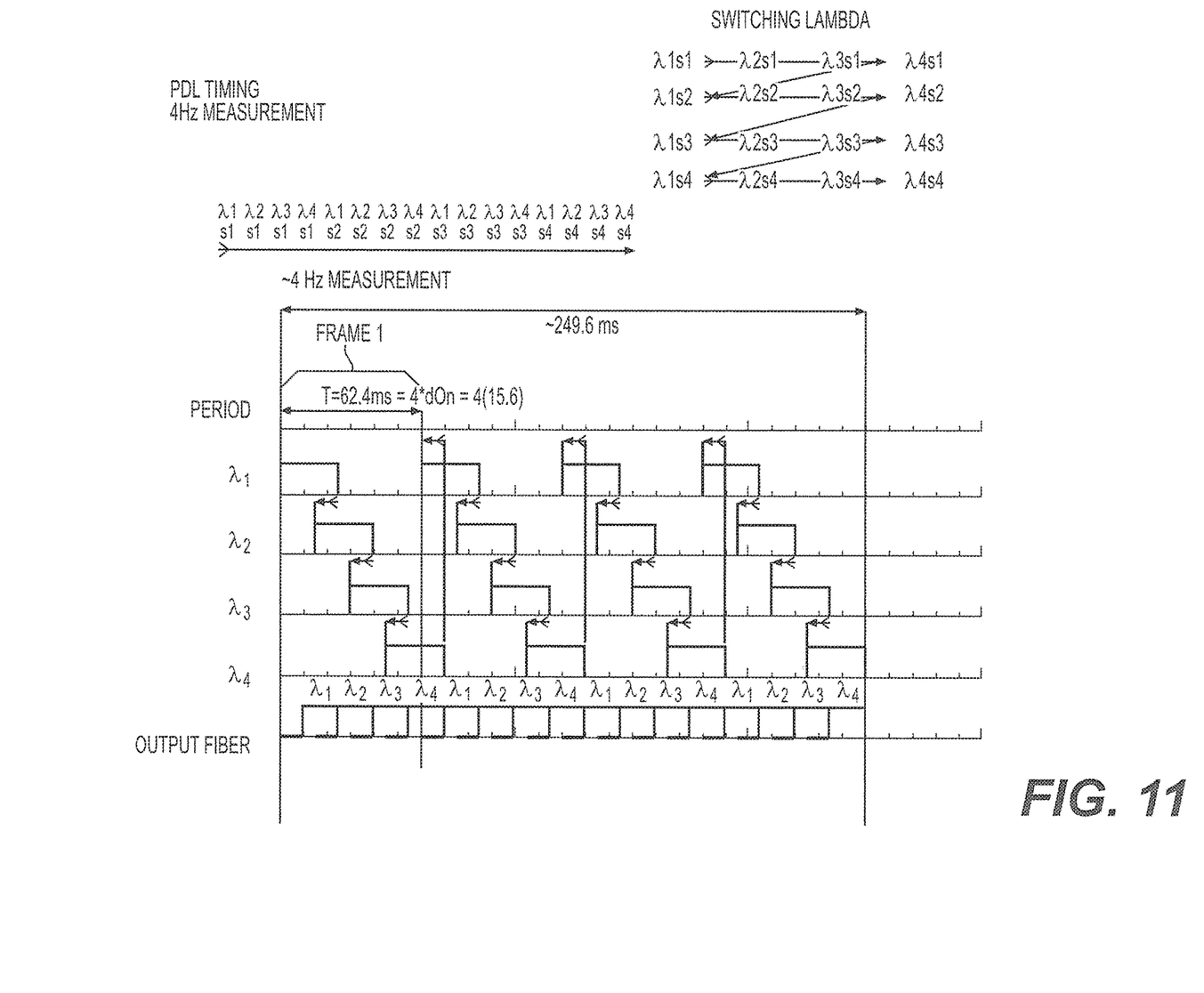
FIG. 11 shows an example of a pulse train and timing for a measurement.

FIG. 11 shows the pulse train and timing for PDL measurements. FIG. 11 is similar to FIG. 9 except for PDL, optical power transmission is measured by the power meter 111 at four known polarization states, and the PDL is calculated from those results using the Mueller-Stokes method. FIG. 11 shows the switching scheme for the lasers to switch between the four polarization states, s1-s4, whereby each laser outputs a pulse at one of $\lambda_{1-4}$. FIG. 11 also shows multiple frames of the pulse train that are output by the lasers on the fiber optic cable. Delay, D, is calculated using equation 1 discussed above to determine timing for sampling to measure optical power transmission for each of $\lambda_{1-4}$ in each of the four polarization states, s1-s4.

Figure 12:
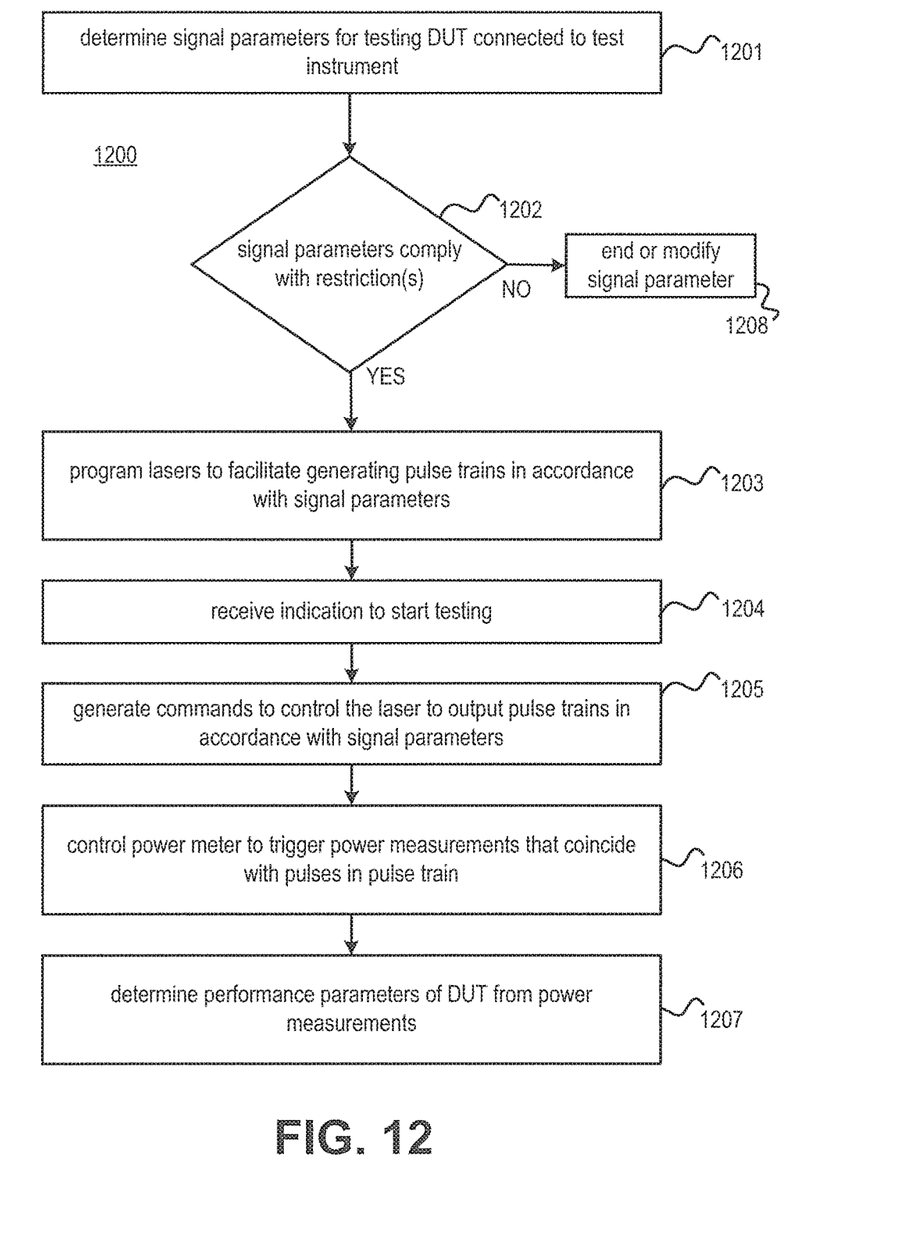
FIG. 12 shows a flowchart of a method that may be performed by the test instrument.

FIG. 12 shows a flowchart of a method 1200 that may be performed by the test instrument 100 according to an example for testing a DUT. The method 1200 is described by way of example with respect to FIGS. 1-2 and other figures referred to below.

At 1201, the test instrument 100 determines signal parameters for testing the DUT 201. The DUT 201 may be connected to the test instrument 100, such as shown in FIG. 2, to test the DUT 201 for determining the performance parameters of the DUT 201. In an example, the test instrument 100 may receive one or more of the signal parameters for testing the DUT 201 from a user via its user interface, such as keypad 105 and display 106, and/or may receive one or more of the signal parameters from another device via the telemetry interface 101. In an example, the signal parameters received from a user or another device may include a length of a system period TS, a pulse start time delay PSTD from the start of the TS for each λ output by the lasers 112, and a period T for each λ output by the lasers 112. These signal parameters are described above with respect to FIGS. 5-6. For example, FIG. 5 shows that the PSTD for a pulse is defined from the start of the TS to the rising edge of the pulse. The T is the duration of the pulse. The PSTD and T of each pulse can be set independently within any one system period. For example, a user may input the PSTD and T for each λ output by the lasers 112. The user may provide the signal parameters in milliseconds. The test instrument 100 may store the signal parameters in the data storage 151. In an example, the signal parameters are stored in registers that are accessible by the processing circuit 150 in order to generate trigger signals to trigger the lasers 112 to emit pulses according to the signal parameters.

Other examples of controls or signal parameters for controlling the pulses emitted by the lasers 112 may include DMTI enabling and laser enabling. For example, a bit may be set in a register in the data storage 151 that indicates whether DMTI is enabled or not. If DMTI is enabled, then the lasers 112 are controlled by the processing circuit 150 to emit pulse trains such as described above. Also, individual lasers of the lasers 112 may be enabled or disabled by setting a bit for each laser. If a bit is set indicating a laser is enabled, then the laser is controlled to generate a pulse for the pulse train; otherwise, the laser is omitted from the pulse train.

At 1202, the test instrument 100 determines whether the signal parameters comply with one or more restrictions For example, the restrictions may include that each laser outputs one pulse in a TS. Another restriction is for system period overrun. To prevent system period overrun, the sum of "PSTD+T" for the λs must be less than the TS, i.e., $\Sigma_1^x(PSTD_x+T_x) \leq TS$, where x is the number of λs transmitted in a TS assuming one pulse is transmitted for each λ in the TS. In case one or more of these restrictions are not met, then, at 1208, the method 1200 may be ended at least temporarily until complying signal parameters are determined. In an example, a notification may be generated via the user interface to modify the signal parameters because they don't comply, and the user may enter modified signal parameters which comply with the restrictions. The signal parameters may be displayed via the user interface of the test instrument 100. In another example, at 1208, the test instrument 100 may fix the non-complying signal parameters. For example, the processing circuit 150 may modify a signal parameter by disabling one or more of the lasers that is causing the TS overrun, and then the method 1200 may be continued.

At 1203, if the signal parameters comply with the restrictions, the processing circuit 150 programs the lasers 112 to facilitate generating pulse trains in accordance with the signal parameters. In an example, the processing circuit 150 may store the signal parameters for TS, T and PSTD in registers, and may also store bits that indicate to enable the lasers 112 when DMTI is enabled for testing.

At 1204, an indication to start testing is received. For example, a user may start the testing via the user interface of the test instrument 100 by clicking a button after DMTI is enabled.

At 1205, the processing circuit 150 generates commands (e.g., trigger pulses such as shown in FIGS. 9 and 11) to control the lasers 112 to output pulse trains in accordance with the signal parameters. Examples are described with respect to FIGS. 5-11. For example, the lasers 112 are pulsed in a serial time-interleaved fashion and power measurements are triggered to coincide with the pulsing as is described below. The pulsing may include directly modulating each laser in sequence in a timing controlled manner in accordance with the signal parameters to combine four λ pulses on a single fiber optic cable.

At 1206, the processing circuit 150 controls the power meter 111 to trigger power measurements that coincide with the pulses in pulse train emitted by the lasers 112. For example, the emitted optical signals are sampled at times determined according to equation 1 described above with respect to FIGS. 8-9 to measure power of the emitted pulses. Also, the power of the received pulses may be measured.

At 1207, performance parameters of the DUT 201 are determined from the power measurements. Examples of the performance parameters may include IL, RL and PDL. The performance parameters may be stored in the data storage 151. The DMTI testing of the DUT 201 allows the test instrument to rapidly build up tables of IL, RL and PDL measurements to determine whether the DUT 201 complies with minimum performance requirements for its intended use.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A test instrument to test optical components, the test instrument comprising:

lasers, wherein each laser is to emit an optical signal at a different wavelength;
a power meter to measure optical power; and
a processing circuit to control the lasers to test a device under test,
  wherein to control the lasers comprises
    selectively modulating the lasers to emit a pulse train of optical signals at the different wavelengths on a single fiber optic cable in a time division multiplexing manner, and
    controlling, based on a determination that signal parameters describing the pulse train comply with a restriction, the lasers in accordance with the signal parameters to emit the pulse train; and
  the processing circuit is further to
    trigger power measurements by the power meter to coincide with the emitted pulse train,
    determine performance parameters of the device under test based on the triggered power measurements, and
    control the lasers to repeatedly emit the pulse train over multiple consecutive system periods to generate pulse trains, wherein the pulse trains are transmitted in frames, and wherein there is no gap between the frames by making each frame of the frames smaller than an on time of a previous pulse of an associated pulse train.

2. The test instrument of claim 1, wherein to selectively modulate the lasers, the processing circuit is to:
determine the signal parameters describing the pulse train; and
output an electrical modulating signal to directly modulate the lasers in accordance with the signal parameters to cause the lasers to emit the pulse train described by the signal parameters.

3. The test instrument of claim 1, wherein the processing circuit is to:
determine whether a system period for the pulse train includes only one pulse for each wavelength; and
based on a determination that the system period includes only one pulse for each wavelength, then determine that the signal parameters describing the pulse train comply with the restriction.

4. The test instrument of claim 1, wherein to trigger power measurements that coincide with the emitted pulse train, the processing circuit is to:
calculate, for each pulse in the pulse train, a delay as a function of latency to directly modulate a corresponding laser for the pulse, a period for the pulse and a pulse start time delay for the pulse; and
trigger a power measurement for each pulse based on the calculated delay for each pulse.

5. The test instrument of claim 1, wherein the pulse train comprises a single pulse for each wavelength.

6. The test instrument of claim 1, wherein the processing circuit is to:
trigger power measurements for each pulse train;
determine the performance parameters for each pulse train; and
store the performance parameters.

7. The test instrument of claim 1, wherein the performance parameters comprise insertion loss.

8. The test instrument of claim 1, wherein the performance parameters comprise return loss.

9. The test instrument of claim 1, wherein the performance parameters comprise polarization dependent loss.

10. The test instrument of claim 1, comprising:
a first port connectable to the device under test to transmit the emitted pulse train of optical signals to the device under test; and
a second port connectable to the device under test to receive the optical signals after the optical signals pass through the device under test,
wherein the power measurements comprise power measurements of the emitted optical signals and the received optical signals.

11. The test instrument of claim 1, wherein to control, based on the determination that signal parameters describing the pulse train comply with the restriction, the lasers in accordance with the signal parameters to emit the pulse train, the processing circuit is to:
control, based on the determination that signal parameters describing the pulse train comply with the restriction that includes a system period overrun, the lasers in accordance with the signal parameters to emit the pulse train.

12. A test instrument comprising:
lasers, wherein each laser is to emit an optical signal at a different wavelength;
a power meter to measure optical power; and
a processing circuit to:
determine signal parameters describing pulses to be emitted by the lasers to test a device under test;
control, based on a determination that signal parameters describing the pulses comply with a restriction, the lasers in accordance with the signal parameters to emit the pulses;
based on the signal parameters, directly modulate the lasers to repeatedly emit the pulses at the different wavelengths on a single fiber optic cable in a time division multiplexing manner; and
control the lasers to repeatedly emit a pulse train over multiple consecutive system periods to generate pulse trains, wherein the pulse trains are transmitted in frames, and wherein there is no gap between the frames by making each frame of the frames smaller than an on time of a previous pulse of an associated pulse train.

13. The test instrument of claim 12, wherein the processing circuit is to:
trigger power measurements by the power meter to coincide with the emitted pulses.

14. The test instrument of claim 13, wherein the processing circuit is to:
determine performance parameters of the device under test based on the triggered power measurements.

15. The test instrument of claim 14, wherein the performance parameters comprise insertion loss.

16. The test instrument of claim 14, wherein the performance parameters comprise return loss.

17. The test instrument of claim 14, wherein the performance parameters comprise polarization dependent loss.

18. The test instrument of claim 12, wherein the processing circuit is to:
determine whether the signal parameters comply with the restriction by determining whether a sum of periods for pulses in the pulse train and pulse start time delays for the pulses in the pulse train is less than or equal to a system period for each pulse in the pulse train.

19. The test instrument of claim 12, wherein the processing circuit is to:

determine whether the signal parameters comply with the restriction by determining whether a system period for each pulse in a pulse train includes only one pulse for each wavelength.

20. A method for testing an optical component of a fiber optic network with a test instrument, the method comprising:

- determining signal parameters describing pulses to be emitted by lasers of the test instrument to test the optical component;
- controlling, based on a determination that signal parameters describing the pulses comply with a restriction, the lasers in accordance with the signal parameters to emit the pulses;
- based on the signal parameters, directly modulating the lasers to repeatedly emit the pulses at different wavelengths on a single fiber optic cable connecting the optical component to the test instrument, wherein the pulses are time division multiplexed on the fiber optic cable;
- triggering powering measurements by a power meter of the test instrument to coincide with the emitted pulses; and
- controlling the lasers to repeatedly emit a pulse train over multiple consecutive system periods to generate pulse trains, wherein the pulse trains are transmitted in frames, and wherein there is no gap between the frames by making each frame of the frames smaller than an on time of a previous pulse of an associated pulse train.

* * * * *